(12) United States Patent
Lungley

(10) Patent No.: US 6,711,387 B1
(45) Date of Patent: Mar. 23, 2004

(54) RADIATION-SHIELDING MOBILE PHONE CASE DEVICE

(76) Inventor: Andrew T. Lungley, 63 Priest Avenue, Wokingham, Berkshire RG40 2LT (GB)

( * ) Notice: Subject to any disclaimer, the term of this patent is extended or adjusted under 35 U.S.C. 154(b) by 622 days.

(21) Appl. No.: 09/687,087

(22) Filed: Oct. 13, 2000

(51) Int. Cl.[7] .................................................. H04B 1/38
(52) U.S. Cl. ..................... 455/90.3; 455/550; 455/575; 455/128; 455/117
(58) Field of Search ......................... 455/300, 90, 525, 455/566, 569, 550, 117, 128, 129, 296, 114, 347, 327; 379/446, 455, 454, 428.1; 174/35 R, 35 MS; 361/816; D14/47, 254, 149, 142, 138

(56) References Cited

U.S. PATENT DOCUMENTS

| | | | |
|---|---|---|---|
| 4,858,798 A | * 8/1989 | Siddoway et al. ........... 224/242 |
| 5,230,016 A | * 7/1993 | Yasuda ........................ 455/573 |
| 5,335,366 A | 8/1994 | Daniels |
| 5,535,434 A | * 7/1996 | Siddoway et al. ........ 455/575.1 |
| 5,535,439 A | 7/1996 | Katz |
| 5,542,105 A | * 7/1996 | Finch et al. .............. 455/575.1 |
| 5,613,221 A | 3/1997 | Hunt |
| 5,657,386 A | 8/1997 | Schwanke |
| 5,659,887 A | * 8/1997 | Ooe ........................ 455/575.9 |
| 5,731,964 A | * 3/1998 | Kitakubo et al. ........... 361/816 |
| 5,777,261 A | * 7/1998 | Katz ......................... 174/35 R |
| 5,819,162 A | 10/1998 | Spann et al. |
| D408,826 S | 4/1999 | Gargasz et al. |
| 6,026,282 A | * 2/2000 | Garcia et al. ............. 455/575.6 |
| 6,275,683 B1 | * 8/2001 | Smith ....................... 455/575.1 |
| 6,314,273 B1 | * 11/2001 | Matsuda ........................ 455/73 |
| 6,360,105 B2 | * 3/2002 | Nakada et al. ........... 455/575.7 |
| 6,389,268 B1 | * 5/2002 | Snyder ........................ 455/90.1 |
| 6,448,490 B1 | * 9/2002 | Katz ........................ 174/35 R |
| 6,570,987 B1 | * 5/2003 | Saarikko ................. 379/428.01 |
| 6,576,832 B2 | * 6/2003 | Svarfvar et al. .......... 174/35 R |
| 6,603,981 B1 | * 8/2003 | Carillo et al. ............... 455/128 |

* cited by examiner

Primary Examiner—Pablo N. Tran

(57) ABSTRACT

A radiation-shielding mobile phone case device for reducing the effects of radiation emitting by the hand-held communication devices. The radiation-shielding mobile phone case device includes a case assembly including a case having a front wall, a back wall, side wall, an open-able top wall, and a bottom wall, and a compartment disposed therein and being adapted to receive and store a mobile communications device; and also includes sheets of mesh material being disposed in the walls of the case.

5 Claims, 2 Drawing Sheets

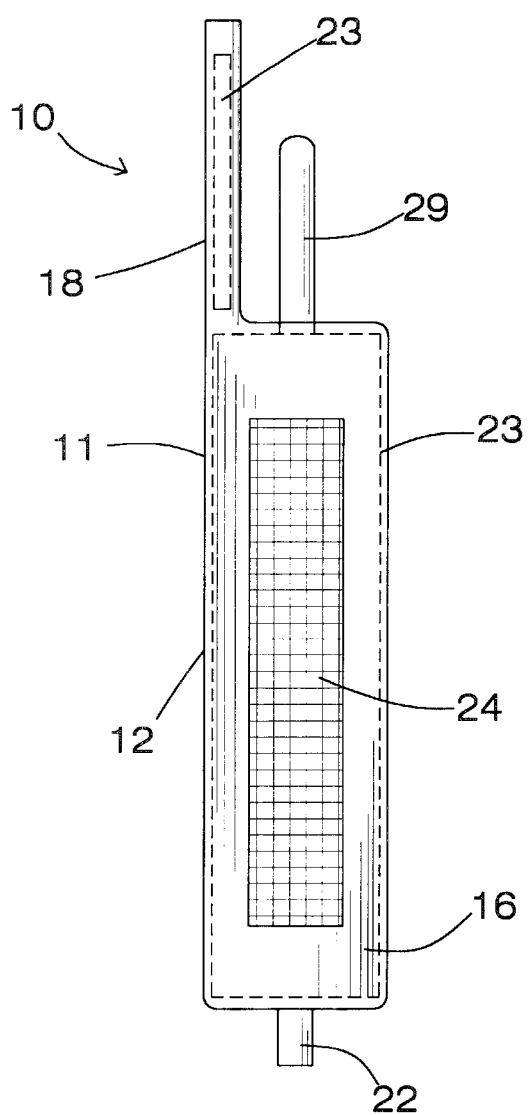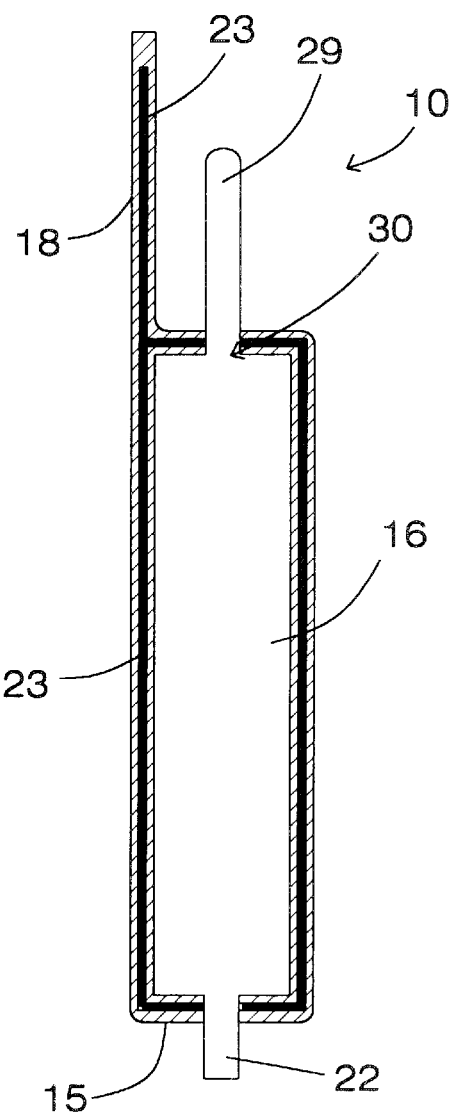
FIG. 3
FIG. 4

RADIATION-SHIELDING MOBILE PHONE CASE DEVICE

BACKGROUND OF THE INVENTION

1. Field of the Invention

The present invention relates to an energy filter mobile phone case and more particularly pertains to a new radiation-shielding mobile phone case device for reducing the effects of radiation emitting by the hand-held communication devices.

2. Description of the Prior Art

The use of an energy filter mobile phone case is known in the prior art. More specifically, an energy filter mobile phone case heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,613,221; U.S. Pat. No. 5,657,386; U.S. Pat. No. 5,819,162; U.S. Pat. No. 5,335,366; U.S. Pat. No. 5,535,439; and U.S. Pat. No. Des. 408,826.

While these devices fulfill their respective, particular objectives and requirements, the aforementioned patents do not disclose a new radiation-shielding mobile phone case device. The inventive device includes a case assembly including a case having a front wall, a back wall, side wall, an open-able top wall, and a bottom wall, and a compartment disposed therein and being adapted to receive and store a mobile communications device; and also includes sheets of mesh material being disposed in the walls of the case.

In these respects, the radiation-shielding mobile phone case device according to the present invention substantially departs from the conventional concepts and designs of the prior art, and in so doing provides an apparatus primarily developed for the purpose of reducing the effects of radiation emitting by the hand-held communication devices.

SUMMARY OF THE INVENTION

In view of the foregoing disadvantages inherent in the known types of energy filter mobile phone case now present in the prior art, the present invention provides a new radiation-shielding mobile phone case device construction wherein the same can be utilized, for reducing the effects of radiation emitting by the hand-held communication devices.

The general purpose of the present invention, which will be described subsequently in greater detail, is to provide a new radiation-shielding mobile phone case device which has many of the advantages of the energy filter mobile phone case mentioned heretofore and many novel features that result in a new radiation-shielding mobile phone case device which is not anticipated, rendered obvious, suggested, or even implied by any of the prior art energy filter mobile phone case, either alone or in any combination thereof.

To attain this, the present invention generally comprises a case assembly including a case having a front wall, a back wall, side wall, an open-able top-wall, and a bottom wall, and a compartment disposed therein and being adapted to receive and store a mobile communications device; and also includes sheets of mesh material being disposed in the walls of the case.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new radiation-shielding mobile phone case device which has many of the advantages of the energy filter mobile phone case mentioned heretofore and many novel features that result in a new radiation-shielding mobile phone case device which is not anticipated, rendered obvious, suggested, or even implied by,any of the prior art energy filter mobile phone case, either alone or in any combination thereof.

It is another object of the present invention to provide a new radiation-shielding mobile phone case device which may be easily and efficiently manufactured and marketed.

It is a further object of the present invention to provide a new radiation-shielding mobile phone case device which is of a durable and reliable construction.

An even further object of the present invention is to provide a new radiation-shielding mobile phone case device which is susceptible of a low cost of manufacture with regard to both materials and labor, and which accordingly is then susceptible of low prices of sale to the consuming public, thereby making such radiation-shielding mobile phone case device economically available to the buying public.

Still yet another object of the present invention is to provide a new radiation-shielding mobile phone case device which provides in the apparatuses and methods of the prior art some of the advantages thereof, while simultaneously overcoming some of the disadvantages normally associated therewith.

Still another object of the present invention is to provide a new radiation-shielding mobile phone case device for reducing the effects of radiation emitting by the hand-held communication devices.

Yet another object of the present invention is to provide a new radiation-shielding mobile phone case device which includes a case assembly including a case having a front wall, a back wall, side wall, an open-able top wall, and a bottom wall, and a compartment disposed therein and being adapted to receive and store a mobile communications device; and also includes sheets of mesh material being disposed in the walls of the case.

Still yet another object of the present invention is to provide a new radiation-shielding Mobile phone case device that reduces immediate exposure of the head and ear to the radiation given, off by the communication devices.

Even still another object of the present invention is to provide a new radiation-shielding mobile phone case device that serves as protection to one's health.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the present invention.

FIG. 4 is a cross-sectional view of the present invention.

DESCRIPTION OF THE PREFERRED EMBODIMENT

Figure 1:
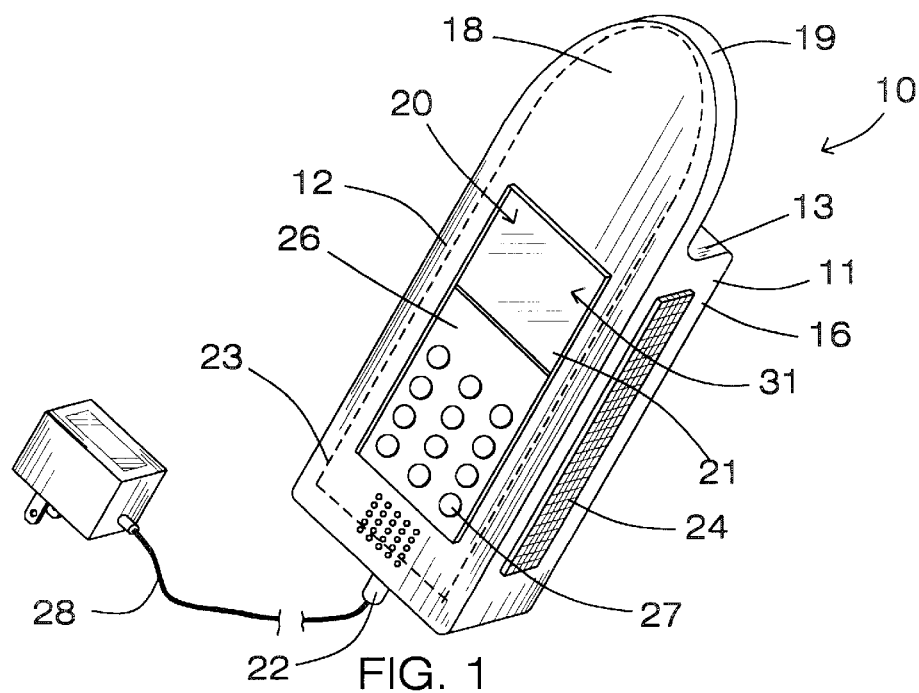
FIG. 1 is a front perspective view of a new radiation-shielding mobile phone case device according to the present invention.
Figure 2:
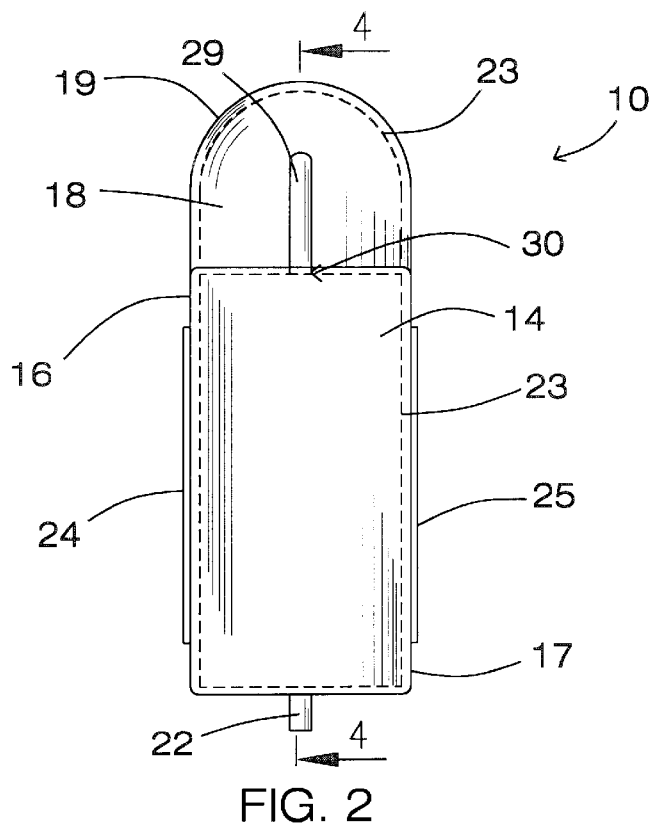
FIG. 2 is a rear elevational view of the present invention.

With reference now to the drawings, and in particular to FIGS. 1 through 4 thereof, a new radiation-shielding mobile phone case device embodying the principles and concepts of the present invention and generally designated by the reference numeral 10 will be described.

As best illustrated in FIGS. 1 through 4, the radiation-shielding mobile phone case device 10 generally comprises a case assembly including a case 11 having a front wall 12, a back wall 14, side walls 16, 17, an open-able top wall 13, and a bottom wall 15, and a compartment 31 disposed therein and being adapted to receive and store a mobile communications device 26. The front wall 12 of the case 11 includes an extended upper portion 18 which extends beyond the side and back walls 15–17. The extended upper portion 18 of the front wall 12 is semi-circular shaped and has an arcuate outer edge 19. The front wall 12 of the case 11 has an opening 20 therein with a flexible transparent cover 21 being securely and conventionally disposed over the opening 20 to allow access to the keypad 27 of the communications device 26 being stored in the compartment 31. The case assembly also includes a tubular stem 22 extending through and outwardly of the bottom wall 15 of case 11 and being adapted to receive a power cord 28 therethrough. The tubular stem 22 is grounded and is adapted to attach to a ground side of a connector for the power cord 28. The open-able top wall 13 includes an antenna-receiving hole 30 disposed therethrough.

Sheets of mesh material 23–25 are securely and conventionally disposed in the walls 12–17 of the case 11 with the sheets of mesh material 23–25 being essentially made of metal and being continuously connected throughout the walls 12–17 of the case 11. The sheets of mesh material 23–25 include first and second sheets of mesh material 24, 25 being securely and conventionally disposed and exposed upon the side walls 16, 17 of the case 11 with the first and second sheets of mesh material 24, 25 being electrically grounded by a user's fingers.

In use, the user stores one's communication device 26 in the compartment 31 of the case 11 and is able to access the keypad 27 through the flexible transparent cover 21 and is able to use the communications device 26 while it is in the case 11. The sheets of mesh material 23–25 prevents radiation from the communications device from adversely affecting the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A radiation-shielding phone case device comprising:
    a case assembly including a case having a front wall, a back wall, side walls, an open-able top wall, and a bottom wall, and a compartment disposed therein and being adapted to receive and store a mobile communications device;
    sheets of mesh material being disposed in said walls of said case;
    said front wall of said case includes an extended upper portion which extends beyond said side and back walls;
    said extended upper portion of said front wall is semi-circular shaped and has an arcuate outer edge;
    said front wall of said case has an opening therein with a flexible transparent cover being disposed over said opening to allow access to the keypad of the communications device being stored in said compartment; and
    aid case assembly also includes a tubular stem extending through and outwardly of said bottom wall of case and being adapted to receive a power cord therethrough, said tubular stem being grounded and being adapted to attach to a ground side of a connector for the power cord.

2. A radiation-shielding phone case device as described in claim 1, wherein said open-able top wall includes an antenna-receiving hole disposed therethrough.

3. A radiation-shielding phone case device as described in claim 1, wherein said sheets of mesh material are essentially made of metal and are continuously connected throughout said walls of said case.

4. A radiation-shielding phone case device as described in claim 3, wherein said sheets of mesh material includes first and second sheets of mesh material being disposed and exposed upon said side walls of said case with said first and second sheets of mesh material being electrically grounded by a user's fingers.

5. A radiation-shielding phone case device comprising:

a case assembly including a case having a front wall, a back wall, side walls, an open-able top wall, and a bottom wall, and a compartment disposed therein and being adapted to receive and store a mobile communications device, said front wall of said case including an extended upper portion which extends beyond said side and back walls, said extended upper portion of said front wall being semi-circular shaped and having an arcuate outer edge, said front wall of said case having an opening therein with a flexible transparent cover being disposed over said opening to allow access to the keypad of the communications device being stored in said compartment, said case assembly also including a tubular stem extending through and outwardly of said bottom wall of case and being adapted to receive a power cord therethrough, said tubular stem being grounded and being adapted to attach to a ground side of a connector for the power cord, said open-able top wall including an antenna-receiving hole disposed therethrough; and sheets of mesh material being disposed in said walls of said case, said sheets of mesh material being essentially made of metal and being continuously connected throughout said walls of said case, said sheets of mesh material including first and second sheets of mesh material being disposed and exposed upon said side walls of said case with said first and second sheets of mesh material being electrically grounded by a user's fingers.

\* \* \* \* \*